(12) United States Patent
Wang et al.

(10) Patent No.: US 12,041,655 B2
(45) Date of Patent: *Jul. 16, 2024

(54) USER EQUIPMENT AND WIRELESS COMMUNICATION METHOD

(71) Applicant: Panasonic Intellectual Property Corporation of America, Torrance, CA (US)

(72) Inventors: Li Wang, Beijing (CN); Lilei Wang, Beijing (CN); Hidetoshi Suzuki, Kanagawa (JP); Masayuki Hoshino, Chiba (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,926

(22) Filed: May 11, 2023

(65) Prior Publication Data

US 2023/0284271 A1 Sep. 7, 2023

Related U.S. Application Data

(63) Continuation of application No. 17/158,672, filed on Jan. 26, 2021, now Pat. No. 11,690,098, which is a
(Continued)

(51) Int. Cl.
*H04W 74/0808* (2024.01)
*H04L 5/00* (2006.01)
*H04W 72/23* (2023.01)

(52) U.S. Cl.
CPC ........... *H04W 74/0808* (2013.01); *H04L 5/00* (2013.01); *H04W 72/23* (2023.01)

(58) Field of Classification Search
CPC ...... H04W 74/0808; H04W 72/23; H04L 5/00
See application file for complete search history.

(56) References Cited

U.S. PATENT DOCUMENTS 9,900,843 B2 * 2/2018 Chen ................... H04W 52/146
9,930,654 B2 3/2018 Nory et al.
(Continued)

FOREIGN PATENT DOCUMENTS

CN 104247488 A 12/2014
CN 104540158 A 4/2015
(Continued)

OTHER PUBLICATIONS

3GPP TS 36.213, V12.6.0, "3rd Generation Partnership Project; Technical Specification Group Radio Access Network; Evolved Universal Terrestrial Radio Access (E-UTRA); Physical layer procedures (Release 12)," Jun. 2015, 241 pages.
(Continued)

*Primary Examiner* — Rhonda L Murphy
(74) *Attorney, Agent, or Firm* — Seed IP Law Group LLP

(57) ABSTRACT

Provided are a user equipment and a wireless communication method for LAA. The user equipment comprises: a receiver operative to receive a UL grant which schedules a subframe for UL transmission; a first circuit operative to perform LBT; a transmitter operative to transmit a PUSCH in the scheduled subframe starting from one available starting position of multiple candidate starting positions in the scheduled subframe if the LBT is successful. According to present disclosure, it is possible to increase the possibility that PUSCH could be sent in the scheduled subframe after LBT.

9 Claims, 4 Drawing Sheets

Related U.S. Application Data continuation of application No. 15/759,490, filed as application No. PCT/CN2015/090637 on Sep. 25, 2015, now Pat. No. 10,939,466.

(56) References Cited

U.S. PATENT DOCUMENTS

| | | |
|---|---|---|
| 10,912,118 B2 | 2/2021 | Tiirola et al. |
| 2011/0039568 A1 | 2/2011 | Zhang et al. |
| 2011/0228722 A1 | 9/2011 | Noh et al. |
| 2012/0002735 A1 | 1/2012 | McCoy |
| 2013/0208587 A1 | 8/2013 | Bala et al. |
| 2013/0315152 A1 | 11/2013 | Ratasuk et al. |
| 2014/0010182 A1 | 1/2014 | Chunli et al. |
| 2014/0029573 A1 | 1/2014 | Lee et al. |
| 2015/0085797 A1 | 3/2015 | Ji et al. |
| 2015/0181589 A1 | 6/2015 | Luo et al. |
| 2015/0201431 A1 | 7/2015 | Um et al. |
| 2015/0215874 A1 | 7/2015 | Chen et al. |
| 2015/0341921 A1 | 11/2015 | Chen et al. |
| 2015/0365931 A1 | 12/2015 | Ng et al. |
| 2017/0048880 A1 | 2/2017 | Anderson et al. |
| 2017/0303288 A1 | 10/2017 | Li et al. |
| 2018/0242283 A1 | 8/2018 | Feng et al. |
| 2018/0288625 A1 | 10/2018 | Chandrasekhar et al. |
| 2018/0302868 A1 | 10/2018 | Bhorkar et al. |
| 2019/0014591 A1 | 1/2019 | Lei |
| 2019/0124687 A1 | 4/2019 | Yang et al. |
| 2019/0289635 A1 | 9/2019 | Wang et al. |

FOREIGN PATENT DOCUMENTS

| | | |
|---|---|---|
| EP | 3355646 A1 | 8/2018 |
| JP | 2015133743 A | 7/2015 |
| JP | 2020014240 A | 1/2020 |
| RU | 2013132662 A | 2/2015 |
| WO | WO 2014189912 A1 | 11/2014 |
| WO | WO 2015038488 A1 | 3/2015 |
| WO | WO 2015042594 A2 | 3/2015 |

OTHER PUBLICATIONS

Alcatel-Lucent Shanghai Bell, Alcatel-Lucent, "UL LBT and DL/UL Frame Structure for LAA," R1-154574, Agenda Item: 7.2.4.1, 3GPP TSG RAN WG1 Meeting #82, Beijing, China, Aug. 25-28, 2015, 6 pages.

Cisco Systems, "Uplink Channel Access for LAA," R1-153844, Agenda item: 7.2.4.1, 3GPP TSG RAN WG1 #82, Beijing, China, Aug. 24-28, 2015, 5 pages.

English translation of Columbian Examiner's Opinion, dated Dec. 7, 2018, for corresponding Colombian Patent Application No. NC2018/0002873, 5 pages.

English translation of Russian Search Report, dated Feb. 25, 2019, for corresponding Russian Patent Application No. 2018110256, 2 pages.

Extended European Search Report, dated Aug. 28, 2018, for corresponding European Patent Application No. 15904436.1-1215, 11 pages.

Indian Examination Report, dated Aug. 17, 2021, for corresponding Indian Patent Application No. 201847009687, 7 pages.

Intel Corporation, "Comparison of evaluation results for various UL LBT options," R1-152645, Agenda Item: 6.2.4.2, 3GPP TSG RAN WG1 Meeting #81, Fukuoka, Japan, May 25-29, 2015, 8 pages.

Intel Corporation, "Uplink transmission with LBT," R2-151102, Agenda Item: 7.1.3, 3GPP TSG-RAN WG2 #89bis, Bratislava, Slovakia, Apr. 20-24, 2015, 6 pages.

International Search Report, dated Jun. 21, 2016, for corresponding International Application No. PCT/CN2015/090637, 2 pages.

Lenovo, "Data transmission in partial subframes for LAA," R1-154512, Agenda Item: 7.2.4.3, 3GPP TSG RAN WG1 Meeting #82, Beijing, China, Aug. 24-28, 2015, 3 pages.

Lenovo, "LBT schemes for LAA DL and UL transmission," R1-154508, Agenda Item: 7.2.4.1, 3GPP TSG RAN WG1 Meeting #82, Beijing, China, Aug. 24-28, 2015, 4 pages.

Panasonic, "Discussion on UL scheduling and transmission," R1-155350, Agenda Item: 7.2.3.1, 3GPP TSG RAN WG1 Meeting #82bis, Malmö, Sweden, Oct. 5-9, 2015, 2 pages.

Samsung, "Partial subframe for LAA," R1-154150, Agenda item: 7.2.4.3, 3GPP TSG RAN WG1 #82, Beijing, China, Aug. 24-28, 2015, 6 pages.

ZTE, "UL framework for LAA," R1-154048, Agenda item: 7.2.4.1, 3GPP TSG RAN WG1 Meeting #82, Beijing, China, Aug. 24-28, 2015, 6 pages.

* cited by examiner

USER EQUIPMENT AND WIRELESS COMMUNICATION METHOD

BACKGROUND

1. Technical Field

The present disclosure relates to the field of wireless communication, and in particular, to a user equipment (UE) and a wireless communication method for Licensed-Assisted Access (LAA).

2. Description of the Related Art

Rapid growth of mobile data forces operators to utilize the finite frequency spectrum with higher and higher efficiency, while plenty of unlicensed frequency spectra are utilized less efficiently only by Wi-Fi, Bluetooth, etc. LTE-U (LTE-unlicensed) and LAA (Licensed-Assisted Access) could extend the LTE spectrum to unlicensed band that would augment the LTE network capacity directly and dramatically.

SUMMARY

One non-limiting and exemplary embodiment provides an approach to increase the possibility that PUSCH could be sent in the scheduled subframe after LBT (Listen Before Talk).

In a first general aspect of the present disclosure, there is provided a user equipment for licensed-assisted access (LAA) comprising: a receiver operative to receive an uplink (UL) grant which schedules a subframe for UL transmission; a first circuit operative to perform listen-before-talk (LBT); a transmitter operative to transmit a first physical uplink shared channel (PUSCH) in the scheduled subframe starting from one available starting position of multiple candidate starting positions in the scheduled subframe if the LBT is successful.

In a second general aspect of the present disclosure, there is provided a wireless communication method for licensed-assisted access (LAA) performed by a user equipment, comprising: receiving an uplink (UL) grant which schedules a subframe for UL transmission; performing listen-before-talk (LBT); transmitting a physical uplink shared channel (PUSCH) in the scheduled subframe starting from one available starting position of multiple candidate starting positions in the scheduled subframe if the LBT is successful.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
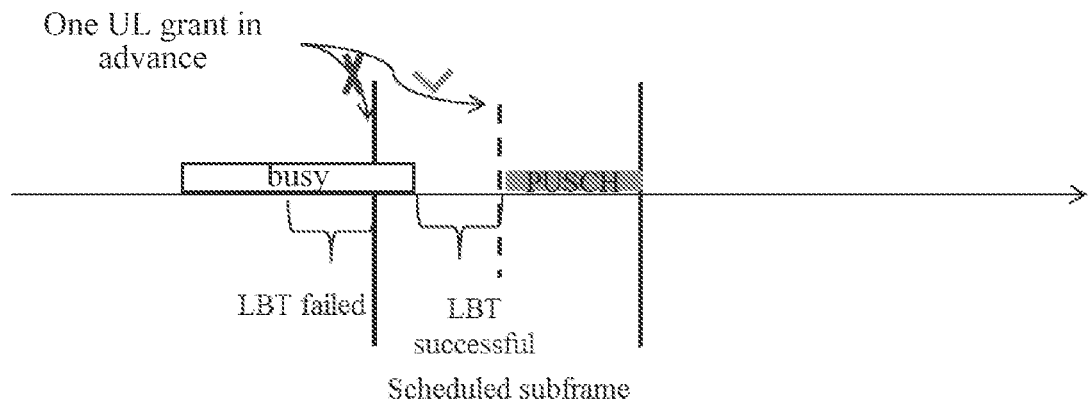
FIG. 1 schematically illustrates a situation where a partial subframe is adopted.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

Different from distributed coordination systems such as Wi-Fi, LTE is an eNB-centric system in which both downlink and uplink data transmissions are scheduled by an eNB. A UL grant for PUSCH (Physical Uplink Shared Channel) should be sent before the granted subframe (for example 4 ms before the granted subframe). On the other hand, according to some regional requirements such as Europe, LBT (Listen Before Talk) is required for a transmitter, which could be either an eNB or a UE. Since the LBT result at the granted subframe is not known during the time sending the UL grant, when the UL grant has been sent but the UE cannot obtain the channel due to LBT failure, scheduling overhead as well as delay would increase.

In order to increase the possibility that PUSCH could be sent at the scheduled subframe after LBT, a PUSCH which can start flexibly at a position within a scheduled subframe subjected to LBT is introduced. A subframe shorter than a normal subframe is referred to as a partial subframe, and a PUSCH carried in a partial subframe is referred to as a partial PUSCH hereinafter. FIG. 1 schematically illustrates a situation where a partial subframe is adopted. As shown in FIG. 1, a UL grant is sent from an eNB to a UE before the scheduled subframe. The UE performs LBT right before the scheduled subframe, but the LBT failed, that is, the channel is busy. In this case, the UE cannot send PUSCH starting from the subframe starting boundary of the scheduled subframe. Then, the UE may perform LBT again within the scheduled subframe. For example, as shown in FIG. 1, if the LBT within the scheduled subframe is successful, according to the present disclosure, a PUSCH can be sent starting from a position within the scheduled subframe, for example, starting from the beginning of the second slot of the scheduled subframe. The PUSCH can end at the subframe ending boundary of the scheduled subframe. The PUSCH starting from a position within the scheduled subframe and ending at the subframe ending boundary of the scheduled subframe is shorter than one subframe and can be referred to as a partial PUSCH.

Figure 2:
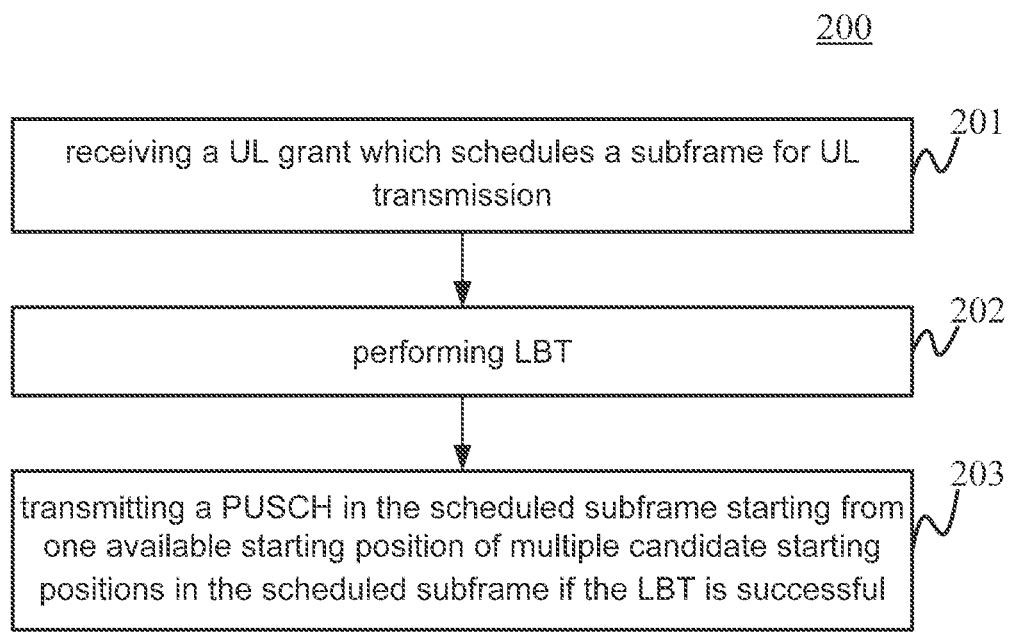
FIG. 2 illustrates a flowchart of a wireless communication method according to an embodiment of the present disclosure.

According to an embodiment of the present disclosure, there is provided a wireless communication method for LAA. FIG. 2 illustrates a flowchart of the wireless communication method 200. The wireless communication method 200 can be performed by a UE and comprise steps 201-203. At step 201, the UE receives a UL grant which schedules a subframe for UL transmission. The UL grant can be sent by an eNB. At step 202, the UE performs listen-before-talk (LBT). At step 203, the UE transmits a PUSCH in the scheduled subframe starting from one available starting position of multiple candidate starting positions in the scheduled subframe if the LBT is successful. In particular, the PUSCH here is the firstly sent PUSCH in a burst, and the firstly sent PUSCH can end at the subframe ending boundary of the scheduled subframe. According to this embodiment, after LBT succeeds, the UE selects a PUSCH start position from available candidate position(s). For example, the UE can send a PUSCH right after the LBT succeeds. It should be noted that any other signals (e.g. preamble, reservation signal, etc.) can also be sent before PUSCH if necessary. If there is no available candidate position after LBT or LBT is not successful in the scheduled subframe, the UE will not send PUSCH in this scheduled subframe.

Figure 3:
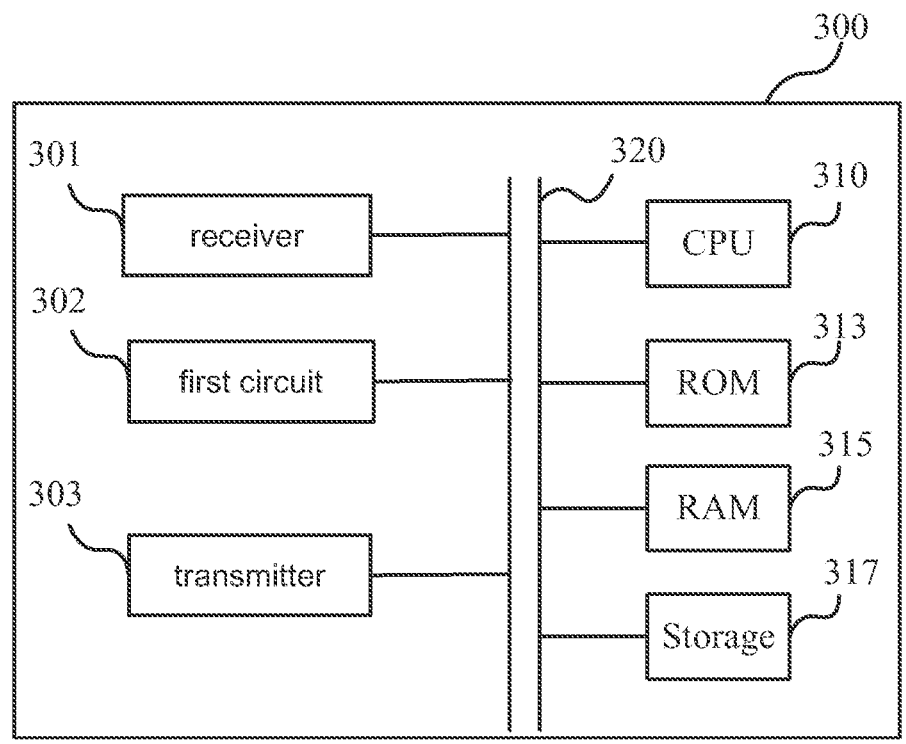
FIG. 3 schematically illustrates a block diagram of a UE according to an embodiment of the present disclosure.

An embodiment of the present disclosure also provides a UE for LAA to perform the above communication method. FIG. 3 schematically illustrates a block diagram of the UE 300 according to an embodiment of the present disclosure. UE 300 can comprise a receiver 301 operative to receive a UL grant which schedules a subframe for UL transmission, a first circuit 302 operative to perform LBT, and a transmitter 303 operative to transmit a first PUSCH in the scheduled subframe starting from one available starting position of multiple candidate starting positions in the scheduled subframe if the LBT is successful.

The UE 300 according to the present disclosure may optionally include a CPU (Central Processing Unit) 310 for executing related programs to process various data and control operations of respective units in the UE 300, a ROM (Read Only Memory) 313 for storing various programs required for performing various process and control by the CPU 310, a RAM (Random Access Memory) 315 for storing intermediate data temporarily produced in the procedure of process and control by the CPU 310, and/or a storage unit 317 for storing various programs, data and so on. The above receiver 301, first circuit 302, transmitter 303, CPU 310, ROM 313, RAM 315 and/or storage unit 317 etc. may be interconnected via data and/or command bus 320 and transfer signals between one another.

Respective components as described above do not limit the scope of the present disclosure. According to one implementation of the disclosure, the functions of the above receiver 301, first circuit 302 and transmitter 303 may be implemented by hardware, and the above CPU 310, ROM 313, RAM 315 and/or storage unit 317 may not be necessary. Alternatively, the functions of the above receiver 301, first circuit 302 and transmitter 303 may also be implemented by functional software in combination with the above CPU 310, ROM 313, RAM 315 and/or storage unit 317 etc.

As described in the above, in one scheduled subframe according to UL grant sent by eNB, PUSCH can start in multiple predefined positions. After LBT succeeds at UE in the scheduled subframe, UE starts PUSCH transmission at one of available predefined position(s). Therefore, the possibility that PUSCH could be sent at the scheduled subframe after LBT is increased.

In an embodiment, there can be two candidate starting positions in the scheduled subframe, which are at the starting points of two slots of the scheduled subframe respectively. Accordingly, there are two candidate PUSCHs corresponding to the two candidate starting positions, wherein a first candidate PUSCH (partial PUSCH) of the two candidate PUSCHs has one slot length, and a second candidate PUSCH (normal PUSCH) of the two candidate PUSCHs has two slot length.

Figure 4:
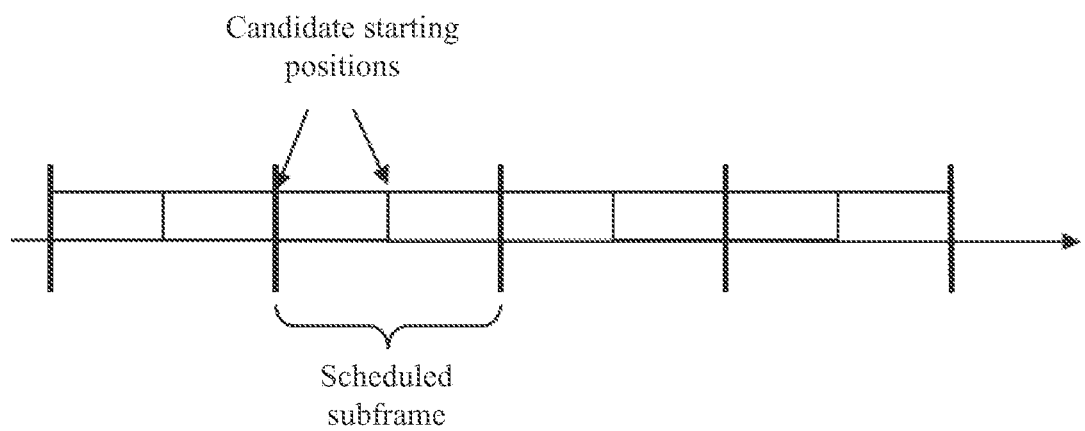
FIG. 4 schematically illustrates an embodiment of the present disclosure in which there are two candidate starting positions for PUSCH in a subframe.

FIG. 4 schematically illustrates an embodiment in which there are two candidate starting positions for PUSCH in a subframe. As shown in FIG. 4, one UL grant from eNB can schedule one PUSCH with 2 possible lengths (i.e. 1 slot or 2 slots) in the scheduled subframe, and the PUSCH can always end at the subframe ending boundary of the scheduled subframe. After LBT succeeds, UE selects a PUSCH starting position from available candidate position(s). It should be noted that any other signals (e.g. preamble, reservation signal, and etc.) could also be sent before PUSCH if necessary. If there is no available candidate position after LBT or LBT is not successful in the scheduled subframe, UE would not send PUSCH in this scheduled subframe.

Since the PUSCH length is not predictable when UL grant is sent, it would be necessary to prepare PUSCHs with two possible lengths (one slot or two slots). According to current UL grant (LTE Release 13), RB allocation, MCS, and number of transport block are indicated to UE. Depending on the assumed PUSCH length, the number of RE for PUSCH transmission can be derived separately.

Regarding the transport block size, there can be two possible approaches. A first option is that two transport blocks (the normal PUSCH assumes N RB allocation and the partial PUSCH assumes $\lfloor N/2 \rfloor$ RB allocation, where N is the allocated RB number indicated in the UL grant) are prepared for respective PUSCH lengths. In other words, in an embodiment, the UE can comprise a second circuit operative to prepare two transport blocks respectively for the two candidate PUSCHs, wherein the second candidate PUSCH (normal PUSCH) assumes N RB allocation, and the first candidate PUSCH (partial PUSCH) assumes $\lfloor N/2 \rfloor$ RB allocation, where N is the allocated RB number indicated in the UL grant. Alternatively, a second option is that one transport block is prepared while reinterpreting the MCS in the UL grant for the partial PUSCH, for example, increasing the modulation order and/or code rate. In other words, in an embodiment, the UE can comprise a second circuit operative to prepare one transport block for the two candidate PUSCHs, wherein the modulation and coding scheme (MCS) indicated in the UL grant is reinterpreted for the first candidate PUSCH.

Figure 5:
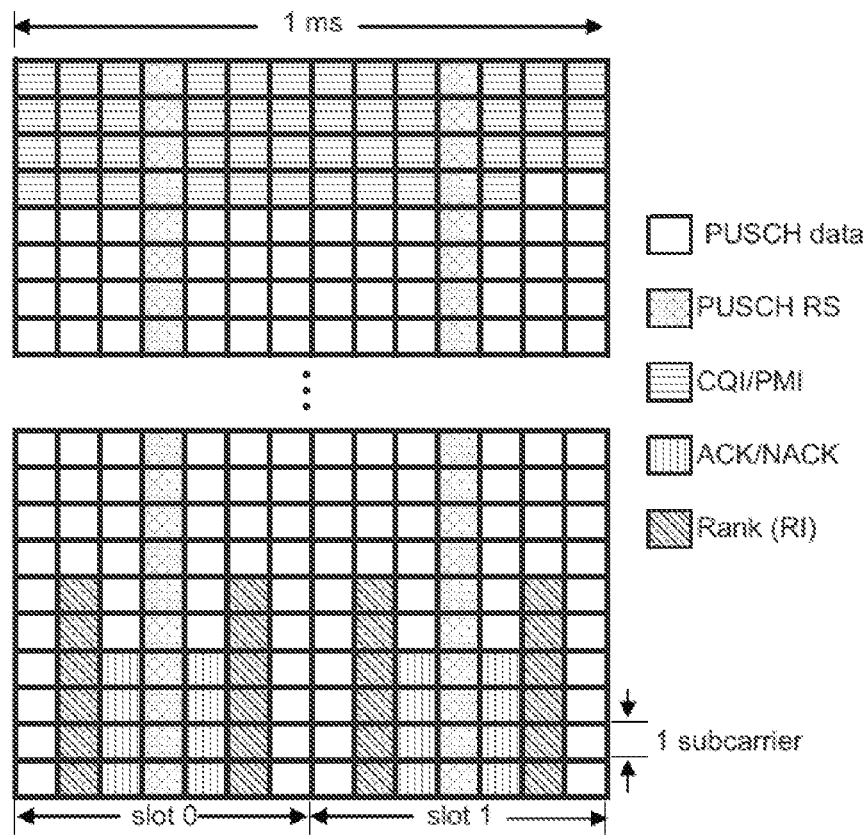
FIG. 5 schematically illustrates RE mapping according to an embodiment of the present disclosure.

Concerning RE mapping, it is feasible to reuse current RE mapping (including time first PUSCH data mapping, PUSCH RS, CQI/PMI, ACK/NACK, RI as shown in FIG. 5) at each slot and TBS determination for a partial PUSCH with one slot length.

Figure 6:
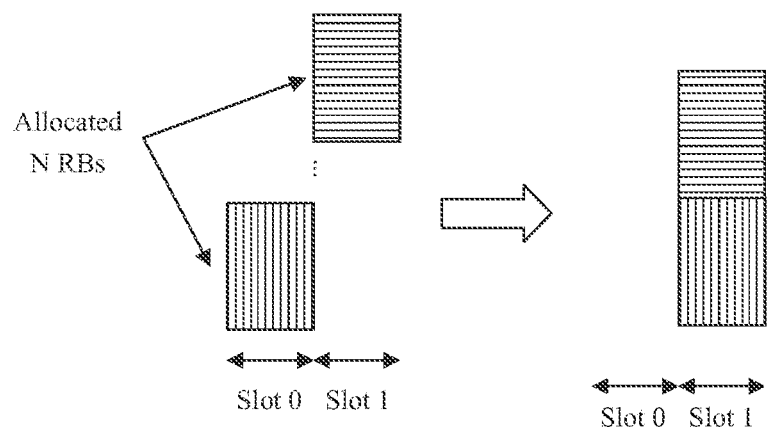
FIG. 6 schematically illustrates formation of one slot length PUSCH by using the intra-subframe frequency hopping according to an embodiment of the present disclosure.

Current intra-subframe frequency hopping for PUSCH supports two slots in different frequency band. FIG. 6 schematically illustrates formation of one slot length PUSCH by using the intra-subframe frequency hopping according to an embodiment of the present disclosure. As shown in left side of FIG. 6, the first slot (slot 0) of all allocated RBs is mapped on one subband while the second slot (slot 1) of all allocated RBs is mapped on another subband (in the same bandwidth as the previous one) which is several RBs away from the former subband. Then, as shown in right side of FIG. 6, by combining the allocated RBs in slot 0 with the allocated RBs in slot 1 into one slot (slot 1), the one slot length PUSCH can be obtained. That is, in time domain, those allocated RBs are put into one slot, and in frequency domain, they can be arranged in the original order and continuously. In other words, in an embodiment, the UE can comprise a third circuit operative to form the first candidate PUSCH by combining allocated RBs in slot 0 and allocated RBs in slot 1 of a two-slot length PUSCH with intra-subframe frequency hopping into one slot.

Figure 7:
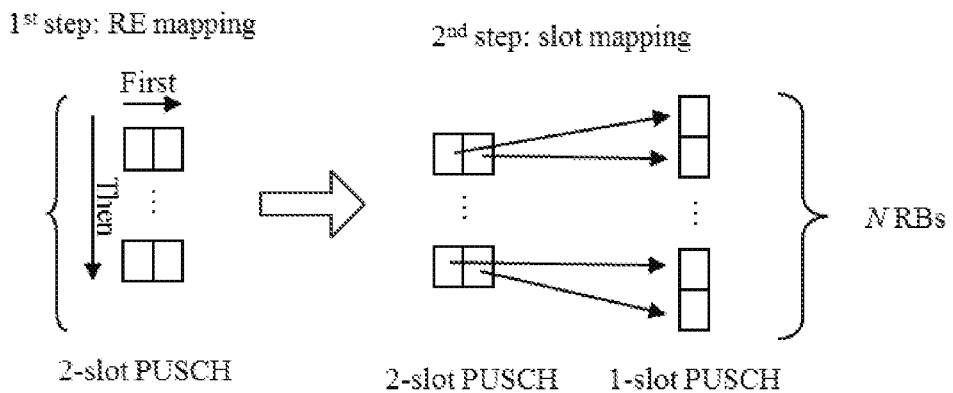
FIG. 7 schematically illustrates formation of one slot length PUSCH by using mapping for a two-slot PUSCH according to an embodiment of the present disclosure.

Alternately, one shortened PUSCH with N-RB×1-slot can use the mapping for a PUSCH with ⌊N/2⌋-RB×2-slot, where N is the allocated RB number indicated in the UL grant. FIG. 7 schematically illustrates formation of one slot length PUSCH by using mapping for a two-slot PUSCH according to an embodiment of the present disclosure. As shown in FIG. 7 assuming N is an even number, in a first step, RE mapping for a 2-slot PUSCH with N/2 RBs is performed, and in a second step, each RB with 2 slots is mapped to 2 adjacent RBs with 1 slot. When N is an even number, all allocated RBs could be occupied by PUSCH with one slot length. If N is an odd number, one of allocated RB s might be dropped by PUSCH with one slot length. According to this embodiment, the UE can comprise a third circuit operative to form the first candidate PUSCH with N-RB×1-slot by using the mapping for a two-slot length PUSCH with ⌊N/2⌋-RB×2-slot, wherein each RB with 2 slots is mapped to 2 adjacent RBs with 1 slot.

As described in the above, it is possible to minimize the specification impact as well as UE transceiver modification/complexity by using slot-level candidate starting position (i.e. 2 starting candidates) since it is possible to reuse the RE mapping, TBS determination, and intra-subframe hopping. It is noted that the second circuit and the third circuit may be implemented by hardware or by functional software, similar to the first circuit 302.

Figure 8:
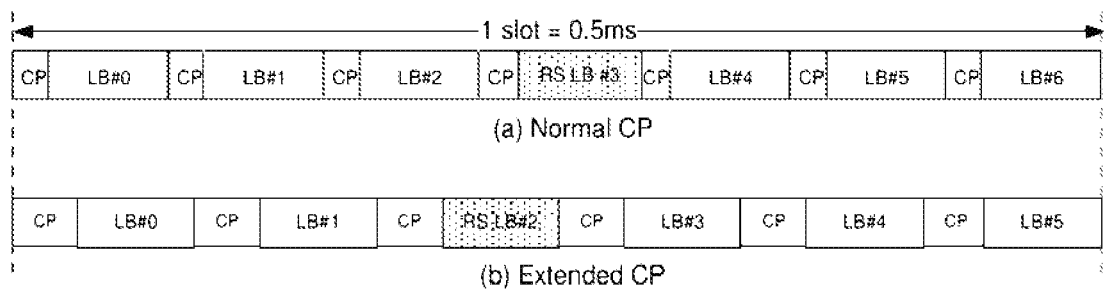
FIG. 8 schematically illustrates an exemplary UL subframe structure according to an embodiment of the present disclosure.

In another embodiment, the candidate starting positions can be in the symbol level. One UL grant from eNB could schedule one PUSCH with maximally 14 possible lengths (i.e. 1 to 14 SC-FDMA (Single-carrier Frequency-Division Multiple Access) symbols) in the scheduled subframe, e.g. 4 starting positions at symbol 0/4/7/11, in case of normal cyclic prefix. SRS (Sounding reference signal) symbol (the last SC-FDMA symbol in the uplink subframe) would be precluded in SRS subframe. After LBT succeeds, UE selects one available PUSCH starting position. For this embodiment, PUSCH should be prepared for multiple possible lengths, and new TBS determination (e.g. scale factor) based on PUSCH length is needed except for 13 symbol and 14 symbol lengths. The current transport block size table defined in 3 GPP TS 36.213 (3rd Generation Partnership Project; Technical Specification Group Radio Access Network; Evolved Universal Terrestrial Radio Access (E-UTRA); Physical layer procedures) assumes normal PUSCH with 14 or 12 symbols depending on CP (Cyclic Prefix) length, so PUSCH with less SC-FDMA symbols would have a scale factor applied to the current TBS proportionally to the number of PUSCH data REs. For example, the scale factor can be calculated by the number of the PUSCH SC-FDMA symbols divided by 14. In addition, new RE mapping starting from the first SC-FDMA symbol of PUSCH except for the 14 symbol length is needed. One approach is to reuse current UL subframe structure aligned with UL subframe structure (i.e. symbols 3/10 if normal CP and symbols 2/8 if extended CP) in licensed carrier as shown in FIG. 8, in which PUSCH RS is always at predefined symbols. In this approach, the PUSCH SC-FDMA symbols in current UL subframe structure is truncated from the beginning. LB (long block) equals to SC-FDMA symbol. Another approach is to shift the UL subframe structure i.e. all SC-FDMA symbols shift from left to right in FIG. 8. In this approach, the UL subframe structure is truncated from the ending. For 13 SC-FDMA length of PUSCH starting from the 2nd SC-FDMA symbol, DMRS shifting one SC-FDM symbol rightward from current subframe with SRS (in the last SC-FDMA symbol of current uplink subframe) is required.

Figure 9:
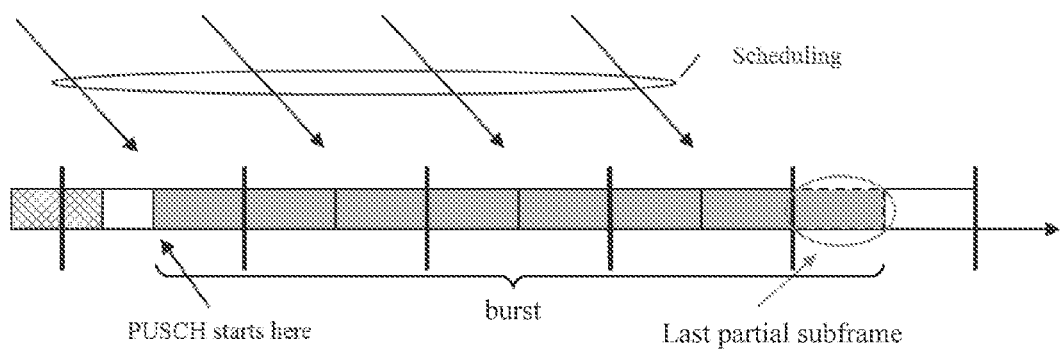
FIG. 9 schematically shows a burst with a partial subframe at the end of the burst to occupy the whole burst.

In another embodiment, the transmitter of the UE can be further operative to transmit a second PUSCH ending at the end of a burst. It is noted that the "first" and "second" in "first PUSCH" and "second PUSCH" in the present disclosure do not limit the sequence of the PUSCHs, but only to differentiate one PUSCH from another. Based on regional regulations, the maximum length of a burst may be restricted, e.g. to 4 ms in Japan and 10 ms in Europe. When one UL burst (consisting of at least one UE's uplink transmission signal) has a partial subframe in the beginning, a partial subframe in the end would be beneficial to reach the maximum allowed occupation which is usually at 1 ms granularity. How to schedule the partial subframe in the end of burst can have multiple approaches. For example, one approach is to independently schedule the partial subframe in the end of the burst by a separate UL grant as other subframes, and another approach is to implicitly schedule the partial subframe in the end of the burst by the UL grant for the partial subframe in the beginning of the burst for the same UE, as shown in FIG. 9. FIG. 9 schematically shows a burst with a partial subframe at the end of the burst to occupy the whole burst. As shown in FIG. 9, the partial subframe at the end of the burst is not explicitly scheduled by a separate UL grant, but implicitly scheduled by the UL grant for the partial subframe in the beginning of the burst. In other words, if the first scheduled subframe of the burst is a partial subframe, the partial subframe at the end of the burst is implicitly scheduled.

In another embodiment, the uplink partial subframe can be jointly scheduled and/or jointly encoded with its adjacent normal subframe if UE is scheduled to more than one subframes successively. If the uplink partial subframe is in the beginning of the burst, its adjacent normal subframe is the next subframe. If the uplink partial subframe is in the end of the burst, its adjacent normal subframe is the previous normal subframe. For example, if the above-mentioned first PUSCH does not start from the subframe beginning boundary of the scheduled subframe, the scheduled subframe can be jointly encoded with its next subframe. If the above-mentioned second PUSCH does not end at the subframe ending boundary of the last subframe of the burst, the last subframe can be jointly encoded with its previous subframe.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

1. A user equipment for licensed-assisted access (LAA) comprising:
a receiver operative to receive an uplink (UL) grant which schedules a subframe for UL transmission;
a first circuit operative to perform listen-before-talk (LBT);
a transmitter operative to transmit a first physical uplink shared channel (PUSCH) in the scheduled subframe starting from one available starting position of multiple candidate starting positions in the scheduled subframe if the LBT is successful.

2. The user equipment according to 1, wherein
the first PUSCH ends at the subframe ending boundary of the scheduled subframe.

3. The user equipment according to 2, wherein
there are two candidate starting positions in the scheduled subframe, which are at the starting points of two slots of the scheduled subframe respectively, and there are two candidate PUSCHs corresponding to the two candidate starting positions, wherein a first candidate PUSCH of the two candidate PUSCHs has one slot length, and a second candidate PUSCH of the two candidate PUSCHs has two slot length.

4. The user equipment according to 3, further comprising:
a second circuit operative to prepare two transport blocks respectively for the two candidate PUSCHs,
wherein the second candidate PUSCH assumes N resource block (RB) allocation, and the first candidate PUSCH assumes $\lfloor N/2 \rfloor$ RB allocation, where N is the allocated RB number indicated in the UL grant.

5. The user equipment according to 3, further comprising:
a second circuit operative to prepare one transport block for the two candidate PUSCHs,
wherein the modulation and coding scheme (MCS) indicated in the UL grant is reinterpreted for the first candidate PUSCH.

6. The user equipment according to 3, further comprising:
a third circuit operative to form the first candidate PUSCH by combining allocated RBs in slot 0 and allocated RBs in slot 1 of a two-slot length PUSCH with intra-subframe frequency hopping into one slot.

7. The user equipment according to 3, further comprising:
a third circuit operative to form the first candidate PUSCH with N-RB×1-slot by using the mapping for a two-slot length PUSCH with $\lfloor N/2 \rfloor$-RB×2-slot, wherein each RB with 2 slots is mapped to 2 adjacent RBs with 1 slot.

8. The user equipment according to 1, wherein
the candidate starting positions are in the symbol level.

9. The user equipment according to 1, wherein
if the first PUSCH does not start from the subframe beginning boundary of the scheduled subframe, the scheduled subframe is jointly encoded with its next subframe.

10. The user equipment according to 1, wherein
the transmitter is further operative to transmit a second PUSCH ending at the end of a burst.

11. The user equipment according to 10, wherein
if the second PUSCH does not end at the subframe ending boundary of the last subframe of the burst, the last subframe is jointly encoded with its previous subframe.

12. A wireless communication method for licensed-assisted access (LAA) performed by a user equipment, comprising:
receiving a uplink (UL) grant which schedules a subframe for UL transmission;
performing listen-before-talk (LBT);
transmitting a first physical uplink shared channel (PUSCH) in the scheduled subframe starting from one available starting position of multiple candidate starting positions in the scheduled subframe if the LBT is successful.

13. The wireless communication method according to 12, wherein
the first PUSCH ends at the subframe ending boundary of the scheduled subframe.

14. The wireless communication method according to 13, wherein
there are two candidate starting positions in the scheduled subframe, which are at the starting points of two slots of the scheduled subframe respectively, and there are two candidate PUSCHs corresponding to the two candidate starting positions, wherein a first candidate PUSCH of the two candidate PUSCHs has one slot length, and a second candidate PUSCH of the two candidate PUSCHs has two slot length.

15. The wireless communication method according to 14, further comprising:
preparing two transport blocks respectively for the two candidate PUSCHs,
wherein the second candidate PUSCH assumes N resource block (RB) allocation, and the first candidate PUSCH assumes $\lfloor N/2 \rfloor$ RB allocation, where N is the allocated RB number indicated in the UL grant.

16. The wireless communication method according to 14, further comprising:
preparing one transport block for the two candidate PUSCHs,
wherein the modulation and coding scheme (MCS) indicated in the UL grant is reinterpreted for the first candidate PUSCH.

17. The wireless communication method according to 14, further comprising:
forming the first candidate PUSCH by combining allocated RBs in slot 0 and allocated RBs in slot 1 of a two-slot length PUSCH with intra-subframe frequency hopping into one slot.

18. The wireless communication method according to 14, further comprising:

forming the first candidate PUSCH with N-RB×1-slot by using the mapping for a two-slot length PUSCH with ⌊N/2⌋-RB×2-slot, wherein each RB with 2 slots is mapped to 2 adjacent RBs with 1 slot.

19. The wireless communication method according to 12, wherein the candidate starting positions are in the symbol level.

20. The wireless communication method according to 12, wherein if the first PUSCH does not start from the subframe beginning boundary of the scheduled subframe, the scheduled subframe is jointly encoded with its next subframe.

21. The wireless communication method according to 12, further comprising:

transmitting a second PUSCH ending at the end of a burst.

22. The wireless communication method according to 21, wherein if the second PUSCH does not end at the subframe ending boundary of the last subframe of the burst, the last subframe is jointly encoded with its previous subframe.

In addition, embodiments of the present disclosure can also provide an integrated circuit which comprises module(s) for performing the step(s) in the above respective communication methods. Further, embodiments of the present can also provide a computer readable storage medium having stored thereon a computer program containing a program code which, when executed on a computing device, performs the step(s) of the above respective communication methods.

The invention claimed is:

1. An integrated circuit comprising:
transmission circuitry, which, in operation, controls transmitting an uplink grant indicating a time resource used for a transmission of data, the time resource comprising a plurality of symbols; and
reception circuitry, which, in operation, controls receiving the data transmitted from one position selected from multiple positions in the time resource,
wherein the multiple positions include a first symbol and an eighth symbol in the time resource, and a same transport block size is used in case of the transmission of the data having a length of 14 symbols transmitted from the first symbol and in case of the transmission of the data having a length of 7 symbols transmitted from the eighth symbol.

2. The integrated circuit according to claim 1, wherein the transmission of the data ends at least on a boundary of the time resource.

3. The integrated circuit according to claim 1, wherein the first symbol is in a first half of the time resource and the eighth symbol is in a second half of the time resource.

4. The integrated circuit according to claim 1, wherein the multiple positions are defined at a symbol level.

5. The integrated circuit according to claim 1, wherein the time resource is indicated by the integrated circuit before a result of a listen before talk (LBT) is determined.

6. The integrated circuit according to claim 1, wherein channel access based on a listen before talk (LBT) fails when a channel is busy.

7. The integrated circuit according to claim 1, wherein the one position of the multiple positions is determined based on a result of channel access of a listen before talk (LBT) performed by a user equipment.

8. The integrated circuit according to claim 1, wherein the time resource is a subframe.

9. The integrated circuit according to claim 1, wherein the data is received using Licensed-Assisted Access (LAA).

* * * * *